US012514769B2

(12) United States Patent
Zhang et al.

(10) Patent No.: US 12,514,769 B2
(45) Date of Patent: Jan. 6, 2026

(54) INTERVENTIONAL OPERATION ISOLATION TRANSFER CABIN

(71) Applicants: BEIJING TSINGHUA CHANGGUNG HOSPITAL, Beijing (CN); TSINGHUA UNIVERSITY, Beijing (CN); TIANJIN RESEARCH INSTITUTE FOR ADVANCED EQUIPMENT, TSINGHUA UNIVERSITY, Tianjin (CN)

(72) Inventors: Ping Zhang, Beijing (CN); Xiangjun Zhang, Beijing (CN); Xiaohao Zhang, Tianjin (CN); Yajun Xue, Beijing (CN); Xiaoying Wang, Beijing (CN); Boda Zhou, Beijing (CN); Yuxiong Wang, Beijing (CN); Rong He, Beijing (CN)

(73) Assignees: BEIJING TSINGHUA CHANGGUNG HOSPITAL, Beijing (CN); TSINGHUA UNIVERSITY, Beijing (CN); TIANJIN RESEARCH INSTITUTE FOR ADVANCED EQUIPMENT, TSINGHUA UNIVERSITY, Tianjin (CN)

( * ) Notice: Subject to any disclaimer, the term of this patent is extended or adjusted under 35 U.S.C. 154(b) by 443 days.

(21) Appl. No.: 18/062,754

(22) Filed: Dec. 7, 2022

(65) Prior Publication Data

US 2023/0172782 A1 Jun. 8, 2023

(30) Foreign Application Priority Data

Dec. 8, 2021 (CN) ......................... 202111487172.2

(51) Int. Cl.
*A61G 10/00* (2006.01)
*A61G 10/02* (2006.01)

(52) U.S. Cl.
CPC ........... *A61G 10/005* (2013.01); *A61G 10/02* (2013.01)

(58) Field of Classification Search
CPC .............................. A61G 10/005; A61G 10/02
See application file for complete search history.

(56) References Cited

U.S. PATENT DOCUMENTS 4,023,219 A * 5/1977 Shindler .............. A61G 10/005 5/629
4,089,571 A * 5/1978 Landy .................. A61G 10/005 422/1

(Continued)

FOREIGN PATENT DOCUMENTS

CN 111658383 A 9/2020
CN 118490458 A * 8/2024 .............. F24F 13/28
CN 118924571 A * 11/2024 ........... A61F 7/0053

OTHER PUBLICATIONS

First Office Action issued in Chinese Application No. 202111487172.2, mailed Jan. 14, 2022; 13 pgs.

*Primary Examiner* — Stephen Hobson
(74) *Attorney, Agent, or Firm* — HAUPTMAN HAM, LLP

(57) ABSTRACT

An interventional operation isolation transfer cabin includes a cabin body, and a lead wire access device and a wire in/out device which two are mounted on the cabin body, the cabin body is provided with a negative pressure generating device at one end and an air inlet at the other end, the negative pressure generating device is provided with an exhaust filter device at its air outlet, and an intake filter device is provided at the air inlet. Several operating openings are provided on side walls of the cabin body, each of the operating openings is in seal connection with an operating glove, and a glove opening of at least one operating glove faces an interior of the cabin body. Equipment wires required by an interven- (Continued)

tional operation are preset through the lead wire access device, and wires added midway under a sealing condition is guaranteed through the wire in/out device.

9 Claims, 3 Drawing Sheets

(56) References Cited

U.S. PATENT DOCUMENTS

D266,700 S * 10/1982 Higgins ........................ D23/277
4,950,222 A * 8/1990 Scott ....................... A61B 90/40 312/1
5,314,377 A * 5/1994 Pelosi, III ............... F24F 3/167 135/93
5,342,121 A * 8/1994 Koria ....................... B25J 21/02 312/1
5,620,407 A * 4/1997 Chang .................. A61G 10/005 128/897
5,728,041 A * 3/1998 Fowler, Jr. ............. A61G 10/02 600/21
5,975,081 A * 11/1999 Hood ....................... A61G 1/04 128/845
6,241,653 B1 * 6/2001 Gauger ................ A61G 10/005 600/21
6,321,764 B1 * 11/2001 Gauger .................. A62B 31/00 135/128
6,461,290 B1 * 10/2002 Reichman ............ A61G 10/005 5/6
D497,429 S * 10/2004 Tetrault ......................... D24/163
7,757,689 B2 * 7/2010 Chang ................... B08B 15/026 128/202.13
9,180,597 B1 * 11/2015 Henry ...................... B25J 21/00
10,016,252 B1 * 7/2018 Wren, Sr. ............. A61G 10/005
10,806,656 B2 * 10/2020 Heyerdahl ............... A61G 1/04
10,842,697 B1 * 11/2020 Comunale ............ A61G 10/005
11,077,005 B1 * 8/2021 Economopoulos .... A61B 46/40
12,115,106 B1 * 10/2024 Alqahtani ............ A61G 10/005
2001/0029955 A1 * 10/2001 Paschal, Jr. .......... A61G 10/005 128/846
2002/0133100 A1 * 9/2002 Paschal, Jr. .......... A61G 10/005 601/16
2004/0111007 A1 * 6/2004 Perlatti ................ A61G 1/0212 600/21
2004/0111008 A1 * 6/2004 Perlatti ................ A61G 10/005 600/21
2004/0177447 A1 * 9/2004 Love .................... A61G 10/005 5/658
2005/0004423 A1 * 1/2005 Shenosky ............ A61G 10/005 600/21
2005/0278838 A1 * 12/2005 Shenosky .......... A41D 19/0089 2/457
2007/0056593 A1 * 3/2007 Kubicsko .............. A61F 5/3769 128/846
2013/0047988 A1 * 2/2013 Delp, II .............. A61M 16/085 128/204.22
2016/0136024 A1 * 5/2016 Poenisch .............. A61G 7/0005 600/21
2018/0303691 A1 * 10/2018 Heyerdahl .............. G21F 7/053
2019/0084166 A1 * 3/2019 Arizono ..................... B25J 1/08
2019/0183709 A1 * 6/2019 Poenisch ................ A61B 42/30
2019/0240848 A1 * 8/2019 Takeuchi ................ B01L 1/025
2020/0085660 A1 * 3/2020 Jenkner ..................... A61G 1/00
2020/0179219 A1 * 6/2020 Petersen .............. A61H 9/0057
2020/0330307 A1 * 10/2020 McKeeman ......... A61G 10/026
2021/0236365 A1 * 8/2021 Zilberman ........... A61N 5/0618
2021/0298973 A1 * 9/2021 Barbosa ............... A61G 7/0526
2021/0307535 A1 * 10/2021 Skelton ................ A47C 29/003
2021/0307872 A1 * 10/2021 Vizulis ................. A61G 10/005
2021/0307984 A1 * 10/2021 Akers .................. A61G 10/005
2021/0307987 A1 * 10/2021 Mosser .................. A61G 10/02
2021/0322242 A1 * 10/2021 Hogan ................. A61G 10/023
2021/0322243 A1 * 10/2021 Hamilton ............. A61G 10/023
2021/0322244 A1 * 10/2021 Moore ..................... E04H 15/20
2021/0353482 A1 * 11/2021 Bardo .................. A61G 10/005
2024/0415604 A1 * 12/2024 Banko ..................... A61G 10/02

* cited by examiner

INTERVENTIONAL OPERATION ISOLATION TRANSFER CABIN

RELATED APPLICATIONS

The present application claims priority from Chinese Application Number 202111487172.2, filed Dec. 8, 2021, the disclosure of which is hereby incorporated by reference herein in its entirety.

FIELD OF THE INVENTION

The present disclosure relates to the field of medical transfer equipment, in particular to an isolation transfer cabin suitable for cardiovascular intervention.

BACKGROUND OF THE INVENTION

With the emergence of epidemic infectious diseases such as SARS, Avian Anfluenza, Influenza A (H1N1), and COVID-19 that seriously endanger the health of human beings, how to effectively prevent and control the infectious diseases and timely eliminate cross-infection has become the focus of attention around the world.

After entering the human body, COVID-19 can invade the heart through ACE2 receptors, and thus cause cardiac damage, which is a risk factor for poor prognosis. The prevalence of cardiovascular and cerebrovascular diseases among patients suffering from COVID-19 cannot be underestimated, which have brought great challenges to medical treatment. The occurrence of myocardial infarction has not decreased ever. However, most patients are impossible to be treated with revascularization directly as affected by the epidemic situation and the lack of isolation equipment. As a result, thrombolytic therapy has been applied, which increases the risk of death. Emergency interventional therapy is still the first choice recommended by international authoritative guidelines for the patients suffering from both acute myocardial infarction and COVID-19.

Cardiac interventional therapy is an effective technology for diagnosing and treating cardiovascular diseases, and it is a method of carrying, under the guidance of angiography, a catheter to a diseased part by puncturing the artery on the surface of the body by means of some instrument, and then performing diagnosis and treatment on the heart disease by using a specific cardiac catheter operation technique. It is a transition between medical treatment and operation, i.e., an invasive diagnosis and treatment method.

However, the existing isolation cabins are merely used for isolation transfer to block infection while moving, which cannot implement further cardiovascular intervention. The epidemic situation has presented a normalization tendency. As such, an urgent problem to be solved is how to carry out cardiovascular intervention while safely transferring and isolating patient.

SUMMARY OF THE INVENTION

In view of the above problems, objectives of the present disclosure are to provide an isolation transfer cabin suitable for cardiovascular intervention, which can not only implement transferring isolation, but also enable cardiovascular intervention in normal cath lab with isolating patient from the environment.

To achieve the above objects, the present disclosure uses the following technical solutions.

An interventional operation isolation transfer cabin, comprising a cabin body, which is provided with a negative pressure generating device at one end and an air inlet at another end, the negative pressure generating device is provided with an exhaust filter device at its air outlet, an intake filter device is provided at the air inlet, a number of operating openings are provided on side walls of the cabin body, each of the operating openings is connected with an operating glove in a sealed manner, and a glove opening of at least one operating glove faces an interior of the cabin body.

Further, the cabin body comprises a bilge, a hatch, a left bulkhead and a right bulkhead, wherein the left bulkhead and the right bulkhead are connected to the left and right ends of the bilge, respectively, in a sealed and fixed manner, left and right ends of the hatch are connected to the left bulkhead and the right bulkhead, respectively, through air-tight zippers, a rear side of the hatch is hinged with a rear side of the bilge, and a front side of the hatch can be opened or closed in relative to a front side of the bilge.

Further, a cross section of the hatch is an arch with a flattened top.

Further, the hatch further comprises a hatch cover and a reinforcement device fixed on the hatch cover, the reinforcement device includes a plurality of lateral support plates and a plurality of longitudinal support rods, the plurality of lateral support plates are installed at intervals along a length direction of the hatch cover, and the plurality of longitudinal support rods are installed at intervals along a perimeter direction between the lateral support plates, the lateral support plates and the longitudinal support rods are perpendicular to each other and are fixedly connected via connecting pieces, and top of a lateral support plate is flat, and both ends of the lateral support plate are symmetrical arcs, which are concentric with each other.

Further, the connecting piece includes a connecting bracket and connecting screws, the connecting bracket is fixed on the lateral support plates via the connecting screws, the longitudinal support rods are supported by the connecting bracket and fixed thereon, and the lateral support plates and the longitudinal support rods are both fixed on an outer wall of the hatch.

Further, further comprised is a drive device for controlling opening or closing of the hatch, the drive device includes a connecting rod and a driving component, and the connecting rod is fixedly mounted on bottom of the rear side of the hatch via a mounting base, one end of the connecting rod is connected to a support rib fixedly mounted on the left bulkhead, an output end of the driving component is coupled to the connecting rod to drive the hatch to open or close.

Further, the hatch is further provided on at least one side with one or more lead wire access devices, wherein the lead wire access devices each are provided with lead wire access interfaces.

Further, the hatch is provided on its top with a wire in/out device for connecting a wire into the cabin, the wire in/out device includes a flexible sleeve and an end cap assembly, and bottom of the flexible sleeve is connected to the top of the hatch in a sealed manner, top of the flexible sleeve is connected to the end cap assembly in a sealed manner, and the end cap assembly is connected to the top of the hatch in a detachably sealed manner.

Further, the end cap assembly includes an end cap, a sealing plug, a sealing collar, and a sealing ring;

Bottom of the end cap is connected to the top of the hatch in a detachably sealed manner;

The sealing collar is detachably embedded and fit on the end cap, bottom of the sealing collar is provided with an annular groove, and the top of the flexible sleeve is pressed into the annular groove by means of the sealing ring; and The sealing plug is concentrically embedded and installed on the sealing collar, and the sealing plug is formed by splicing two half-frustum sealing plates together, both of which are provided with a semicircular recess, the semicircular recesses on both of the sealing plates cooperate to form a circular through groove for the wire to pass through.

Further, the flexible sleeve is made of plastic film.

Using the above-mentioned technical solutions, the present disclosure has the following advantages:

(1) The interventional operation isolation transfer cabin provided by the present disclosure can implement rapid transfer, detection and clinical coronary intervention for a patient suffering from severe infectious disease on the premise of ensuring safety of medical staff and the environment, thereby enabling safe treatment with isolating doctors from patient;

(2) The lead wire access device is provided, in which wire clamping recesses can be replaced according to a type of wire required by the operation, so that it is possible to placed required wires into the isolation cabin as early as possible before the operation according to different medical department scenarios, and thereby preparation for the operation can be done in advance.

(3) In order to achieve insertion of relevant wires during the operation, the wire in/out device is provided, in which clamped sealing is enabled at both ends of the plastic sleeve. At the same time, the wire clamping socket can be designed as desired so that a wire of any device can be inserted during the operation, which enables pollution-free wire insertion midway in the operation and solves the problem of replacing wire midway in the operation.

(4) The top of the hatch of the isolation cabin is flattened, which can reduce a distance between angiography instrument and the human heart, so that angiography can be performed more clearly and accurately during the operation, and safety and reliability of the operative treatment are improved.

(5) The negative pressure generating devices are connected to the bulkheads at both ends, a stable negative pressure is generated in the entire isolation cabin by using a suction device of N99 protection level and a differential pressure monitoring device, and the bulkheads are coupled with a hatch switch device so that the hatch can be opened and braced automatically.

DETAILED DESCRIPTION OF THE EMBODIMENTS

In order to make the objectives, technical solutions and advantages of the present disclosure more definite, the technical solutions of the present disclosure will be described below in a clear and complete manner with reference to the accompanying drawings. Apparently, the described embodiments are partial, but not all, embodiments of the present disclosure. Based on the embodiments of the present disclosure, all other embodiments obtained by those of ordinary skill in the art without creative works shall fall within the protection scope of the present disclosure.

In the description of the present disclosure, it should be noted that the orientations or positional relationships indicated by the terms "upper", "lower", "inner", "outer", etc. refer to the orientations or positional relationships shown in the figures, which are only for the convenience of describing the present disclosure and simplifying the description, other than indicating or implying that the referred system or element must have a specific orientation and be constructed and operated in a specific orientation, and therefore should not be construed as a limitation of the present disclosure. In addition, the terms "first", "second" and the like are used to define parts and components, and are only for the convenience of distinguishing these parts and components. Unless otherwise stated, the above wordings have no special meaning and should not be construed as indicating or implying relative importance.

In the description of the present disclosure, it should be noted that, unless otherwise expressly specified and defined, the wordings "install," "couple," and "connect" should be understood in a broad sense. For example, it can be fixed connection, detachable connection, or integrated connection; it can be mechanical connection, and also electrical connection; it can be directly connected, indirectly connected through an intermediate medium, or internal communication between two elements. For those of ordinary skill in the art, the specific meanings of the above terms in the present disclosure can be understood according to specific scenarios.

Figure 1:
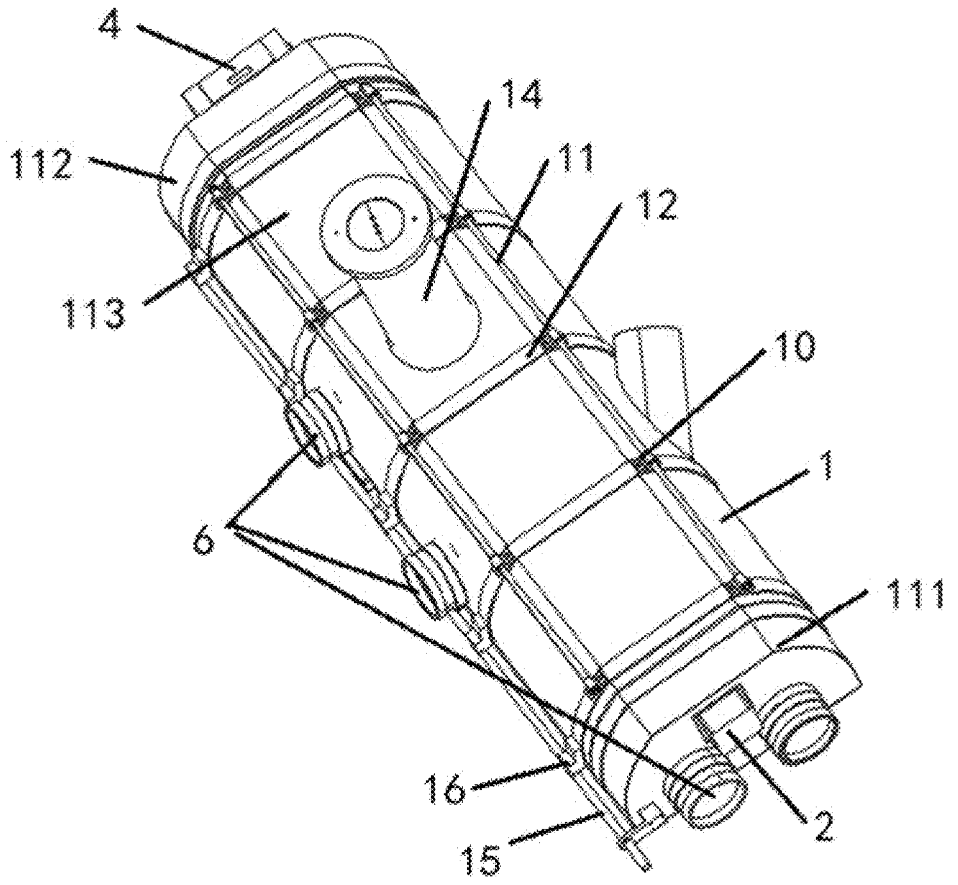
FIG. 1 is a schematic diagram of a structure of an interventional operation isolation transfer cabin provided by an embodiment of the present disclosure.
Figure 2:
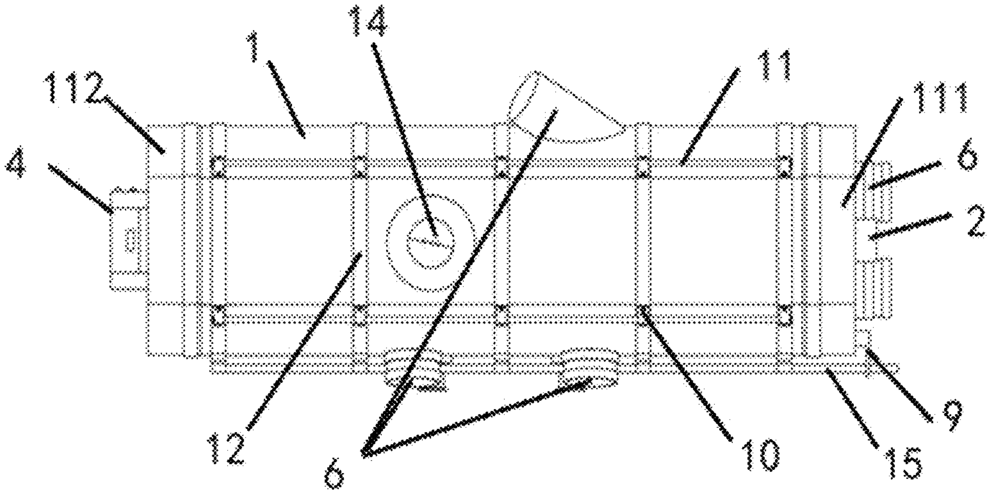
FIG. 2 is a top view of the interventional operation isolation transfer cabin.
Figure 3:
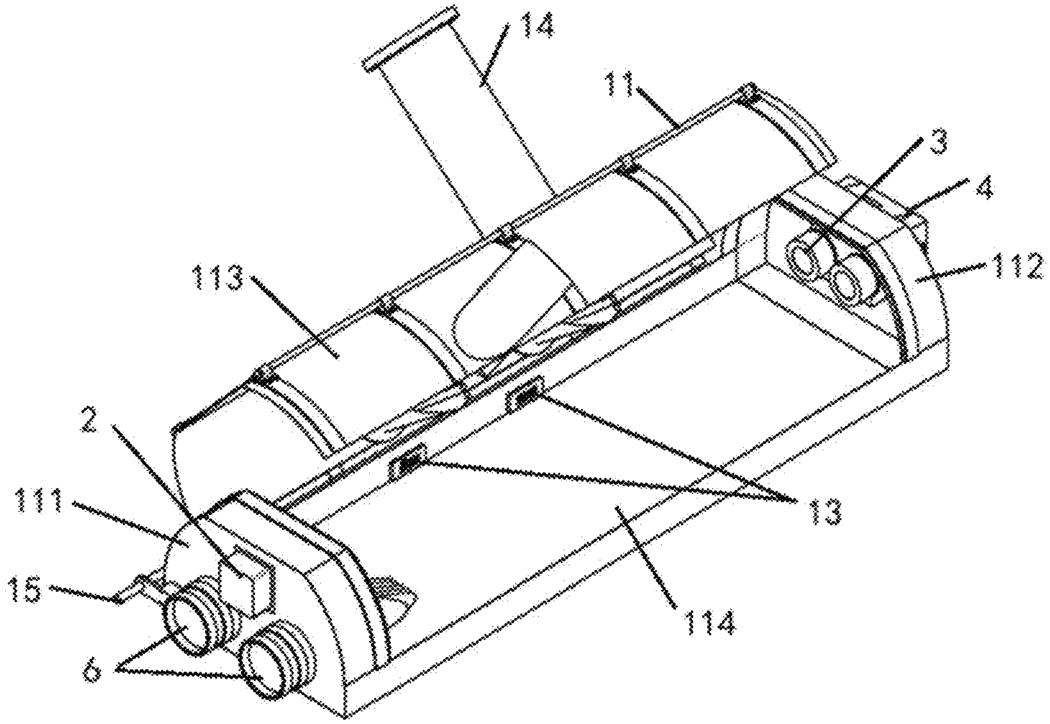
FIG. 3 is a view in which a hatch in an opened state.

As shown in FIGS. 1 to 3, an interventional operation isolation transfer cabin is provided by an embodiment of the present disclosure, which can perform quick transfer, detection, and clinical coronary interventional operation, e.g., cardiac interventional operation, for a patient suffering from severe infectious disease on the premise of ensuring safety of medical staff and the environment, thereby achieving safe treatment with isolating doctors from patient.

As shown in FIGS. 1 to 3, the interventional operation isolation transfer cabin includes a cabin body 1, which is provided with a negative pressure generating device 4 at one end and an air inlet at the other end. The negative pressure generating device 4 is provided with an exhaust filter device 3 at its air outlet. An intake filter device 2 is provided at the air inlet. A number of operating openings 6 are provided on side walls of the cabin body 1, and each of the operating openings is connected with an operating glove in a sealed manner. A glove opening of at least one operating glove faces an interior of the cabin body 1, while glove openings of the rest operating gloves face the outside of the cabin.

In use, using the negative pressure generating device 4, it is possible to lower a negative pressure in the cabin body 1 than −15 Pa, with a ventilation rate of 50 L/min. The outside fresh air is filtered by the intake filter device 2 and then enters the cabin body 1 through the air inlet so as to provide clean air for the infectious patient. The exhaust filter device 3 and the intake filter device 2 form together as a filter system so that an aerosol leakage rate at the air outlet of the cabin does not exceed 0.01%. The patient is lying in the cabin body 1 while his/her right arm is extended outwards from one of the operating gloves of which glove opening faces the interior of the cabin. A doctor performs outside the cabin body 1 cardiac interventional operative treatment on the patient by means of radial artery puncture. In addition, through the operating gloves of which glove openings face the outside of the cabin, the medical staff can put their hands into the gloves to perform comprehensive detection and treatment on the patient.

Therefore, the interventional operation isolation transfer cabin provided by the present disclosure can implement cardiac interventional therapy for a patient in case of being infected with infectious disease, such as COVID-19, so as to prevent the doctors from being infected during treatment, and achieve safety treatment with isolating doctors from patient.

A size of the cabin body 1 is preferably 2000 in length× 600 in width×350 in height, and an exterior overall size of a cabin casing of the isolation cabin meets the size requirements in height for the people of 95%, and is also convenient for transfer and surgical operations.

The operating gloves are preferably disposable plastic film gloves. The negative pressure generating device 4 is communicated with the interior of the cabin body 1 through a negative pressure collection pipe (not shown in the figure), the pressure in the cabin body 1 is detected through the negative pressure collection pipe, and the pressure inside the cabin body 1 is regulated according to a detected result, so that the interior of the cabin body 1 is kept in a stable pressure state.

Further, during the operative treatment, in order to enable more accurate and clear angiogram for the operation by angiography instrument to improve a success rate of the operation, a cross section of the cabin body 1 is configured in an arch shape with a flattened top. Compared with a pattern of the existing technology in which the cross section of the cabin body 1 is configured as a semicircle as a whole, the top of the cabin body 1 is flattened in the present disclosure, which can reduce a distance between the angiography instrument and the human heart to enable clear and more accurate angiogram during the operation, thereby improving the safety and reliability of the operative treatment.

Specifically, the cabin body 1 includes a bilge 114, a hatch 113, a left bulkhead 111, and a right bulkhead 112. The left and right bulkheads 111, 112 are connected to left and right ends of the bilge 114, respectively, in a sealed and fixed manner. Left and right ends of the hatch 113 are connected to the left bulkhead 111 and the right bulkhead 112, respectively, through airtight zippers in a sealed manner. Front and rear sides of the hatch 113 are connected to front and rear sides of the bilge 114, respectively, in a sealed manner. In the present disclosure, by connecting the left and right ends of the hatch 113 to the left and right bulkheads 111, 112, respectively, through airtight zippers in a sealed manner, it is facilitated to quickly seal up or open the cabin body 1. Upon opening the cabin body, medical supplies can be put into the cabin body 1 by the medical worker so that the whole process of putting items into the isolation cabin during transfer can be completed.

As shown in FIG. 3, in order to facilitate the patient to quickly enter the cabin body 1, the rear side of the hatch 113 is hinged with the bilge 114, and the front side of the hatch 113 can be opened or closed in relative to the bilge 114. By opening or closing the hatch 113, it is convenient for quick entering of the patient in the cabin body 1 before the later closing so that a quick seal-up of the cabin body 1 is enabled.

In order to facilitate opening of the hatch 113, the interventional operation isolation transfer cabin further includes a drive device for controlling the opening or closing of the hatch 113. The drive device includes a connecting rod 15 and a driving component (not shown in the figure). The connecting rod 15 is fixedly mounted on the bottom of the rear side of the hatch 113 via a mounting base 16. The connecting rod 15 is connected to a support rib 9 arranged on the left bulkhead 111. An output end of the driving component is coupled to the connecting rod 15 to drive the hatch 113 to open or close. The left bulkhead 111 is further provided with a control button (not shown in the figure), which is configured to control the opening or closing of the hatch 113.

The driving component is preferably a drive motor.

In order to strengthen and firm the hatch 113 as a whole, the hatch 113 includes a hatch cover and a reinforcement device fixed on the hatch cover. The reinforcement device includes a plurality of lateral support plates 12 and a plurality of longitudinal support rods 11. The plurality of lateral support plates 12 are installed at intervals along a length direction of the hatch cover, and the plurality of longitudinal support rods 11 are installed at intervals along a perimeter direction between the lateral support plates. The lateral support plates 12 and the longitudinal support rods 11 are perpendicular to each other. The top of each lateral support plate 12 is flat, and both ends thereof are symmetrical arcs, which are concentric with each other.

The lateral support plates 12 and the longitudinal support rods 11 are connected with each other via connecting pieces, including a connecting bracket 10 and connecting screws. The connecting bracket 10 is fixed on the lateral support plates 12 via the connecting screws, the longitudinal support rods 11 are supported by the connecting bracket 10 and fixed thereon, and the lateral support plates 12 and the longitudinal support rods 11 are both fixed on an outer wall of the hatch 113. In the present disclosure, by configuring the hatch cover and the lateral support plates 12 to be flat at the top, the distance between the angiography equipment and the human body can be reduced so that the reliability and accuracy of angiography is improved.

In this case, two lateral support plates 12 are fixed on the left and right side ends of the hatch cover, respectively, and a function of the lateral support plates 12 at both ends are to enable both ends of the hatch 113 to be well embedded between a left side wall 111 and a right side wall 112 and each fit to the left and right side walls 111, 112.

In this case, preferably, the hatch cover is preferably made of PVC plastic. The lateral support plates 12 and the longitudinal support rods 11 are preferably made of thermosetting plastics.

The hatch 113 is further provided on one side with at least one lead wire access device 13, in which a lead wire interface is provided. Using the lead wire interface, equipment such as electrocardiogram measuring instrument can be directly coupled to the cabin body 1, then the medical worker completes the electrocardiogram detection by inserting his/her hands into the operating gloves to connect electrocardiogram pipelines to the patient.

Figure 4:
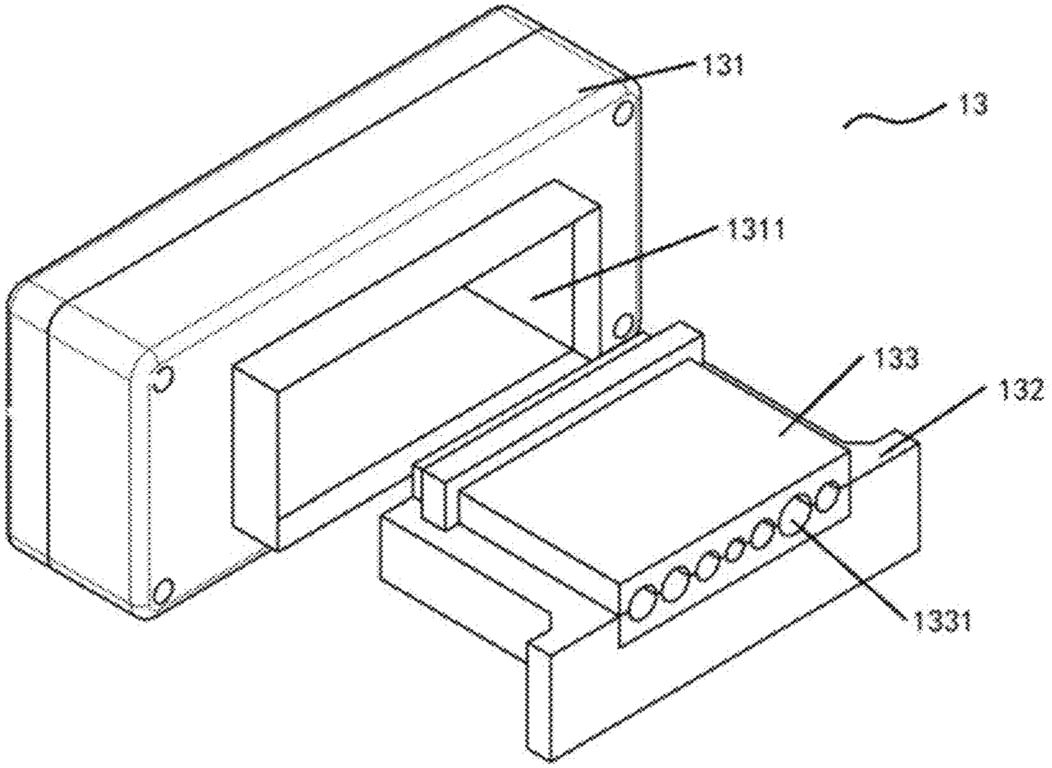
FIG. 4 is a schematic diagram of a structure of a lead wire access device.

As shown in FIG. 4, the lead wire access device 13 includes a sealing connection socket 131 and a wire clamping mechanism. The sealing connection socket 131 is connected to the hatch 113 in a sealed and clamped manner. The sealing connection socket 131 is provided with an opening 1311, and the wire clamping mechanism is embedded within the opening 1311 and is connected to the sealing connection socket 131 in a detachably sealed and clamped manner. The wire clamping mechanism includes a base 132 and a clamping socket mounted on the base 132. The clamping socket includes two clamping bases 133 arranged opposite to each other up and down, and clamping recesses 1331 are provided on each of the clamping bases 133. The clamping recesses 1331 on the both clamping sockets 133 are fit to form cylindrical through grooves for wires to pass through. In use, wires related to the operation are placed in the recess 1331, then the upper and lower clamping bases are clamped tightly into the base 132, and finally the base 132 as a whole is inserted into the opening 1311 of the sealing connection socket 131 to enable a sealed connection.

In use, in order to enable rapid placement of relevant wires before the operation, the lead wire access device 13 is provided, in which the clamping recess 1331 can be individually adapted in design according to a wire type desired for the operation so that it is possible to placed desired wires into the isolation cabin as early as possible before the operation according to different medical department scenarios, and thereby preparation for the operation can be done in advance.

During the treatment, in order to facilitate connection of other auxiliary equipment for patient treatment, for example, connecting treatment equipment like an infusion catheter or a defibrillator that has to be added midway to the cabin body 1, the hatch 113 is provided on the top with a wire in/out device 14 to lead and connect a wire into the cabin body 1.

Figure 5:
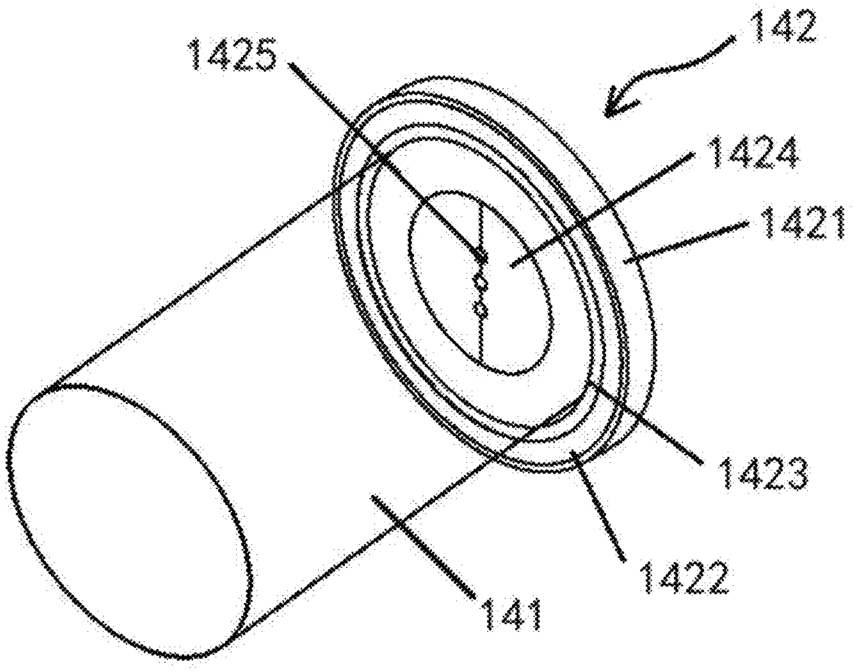
FIG. 5 is a schematic diagram of a structure of a wire in/out device.

As shown in FIG. 5, the wire in/out device 14 includes a flexible sleeve 141 and an end cap assembly 142 for closing the top of the flexible sleeve 141. The bottom of the flexible sleeve 141 is connected to the top of the hatch 113 in a sealed manner. The end cap assembly 142 includes an end cap 1421, a sealing plug 1424, a sealing collar 1422 and a sealing ring 1423. The bottom of the end cap 1421 is connected to the top of the hatch 113 in a detachably sealed manner. The sealing collar 1422 is detachably embedded and fit on the end cap 1421. The sealing plug 1424 is concentrically positioned and embedded in the sealing collar 1422, and is provided with a through hole 1425 for the wire to pass through. The top of the flexible sleeve 141 is assembled to the bottom of the sealing collar 1422 via the sealing ring 1423 in a sealed and fixed manner.

In the case that the wire in/out device is not in use, the flexible sleeve 141 is folded within the end cap 1421, and the end cap 1421 is seized up at the top of the hatch 113. In the case that the wire in/out device needs to be used, the end cap 1421 is pulled out from the top of the hatch 113, the flexible sleeve 141 is thus unfolded, and then a catheter is inserted into the cabin body 1 through the through hole 1425 on the sealing plug 1424. After use, the flexible sleeve 141 is folded once again and pressed on the top of the hatch 113. The end cap 1421 can be fixed onto the top of the hatch 113 in, specifically, a seizing-up manner.

In order to facilitate insertion and connection of the wire to the cabin body 1, the sealing plug 1424 is formed by splicing two half-frustum sealing plates together, and the through hole 1425 is formed by splicing two semicircular recesses located on both of the half-frustum sealing plates together. In use, one half of the sealing plug is first detached, the catheter is snapped into a semicircular recess, and then the other half sealing plate is spliced back.

The arrangement of the flexible sleeve 141 can function as a flexible extension seal. The flexible sleeve 141 is preferably made of plastic, which not only reduces the cost, but also has better sealing performance.

In use of the interventional operation isolation transfer cabin provided by the present disclosure, the patient is isolated inside the cabin body 1, upon cardiac interventional operation is required, the patient extends from the operating opening 6 the right hand to be suffered from the operation. Under the guidance of angiography methods, the catheter is carried to a diseased part by means of some instrument after puncturing the blood vessels on the body surface, and diagnosis and treatment is performed with respect to the heart disease by using specific cardiac catheterization techniques. At the same time, auxiliary detection equipment such as an electrocardiograph can be connected via the lead wire access device 13, and other equipment that has to be added midway such as an infusion pipeline or a defibrillator can be connected via the wire in/out device 14.

Therefore, the present disclosure can implement rapid transfer, detection and clinical coronary interventional operation for the patient suffering from severe infectious disease on the premise of ensuring the safety of medical staff and the environment, thereby achieve safe treatment with isolating doctors from patient.

Finally, it should be noted that the above embodiments are intent to provide illustration only for the technical solutions of the present disclosure, instead of limitation thereto. Although the present disclosure has been described in detail with reference to the above embodiments, it should be understand by those of ordinary skill in the art that modifications still can be made to the technical solutions described in the various foregoing embodiments, or equivalent replacements can still be made to some technical features thereof; and that the essence of the technical solutions related to these modifications or replacements do not deviate from the spirit and scope of the technical solutions of the embodiments of the present disclosure.

What is claimed is:

1. An isolation transfer cabin for interventional operation, comprising:

a cabin body, which is provided with a negative pressure generating device at a first end and an air inlet at a second end;

wherein the negative pressure generating device is provided with an exhaust filter device at an air outlet of the negative pressure generating device;

wherein the air inlet comprises an intake filter device;

wherein a plurality of operating openings are provided on side walls of the cabin body;

wherein each of the operating openings is connected with an operating glove in a sealed manner, and a glove opening of at least one operating glove faces an interior of the cabin body;

wherein the cabin body comprises a bilge, a hatch, a left bulkhead, and a right bulkhead;

wherein the left bulkhead and the right bulkhead are connected to a left end and a right end of the bilge in a sealed and fixed manner, respectively;

wherein left end and right end of the hatch are connected to the left bulkhead and the right bulkhead, through airtight zippers, respectively;

wherein a rear side of the hatch is hinged with a rear side of the bilge; and wherein a front side of the hatch can be opened or closed relative to a front side of the bilge.

2. The isolation transfer cabin for interventional operation according to claim 1, wherein;

a cross section of the hatch is an arch with a flattened top.

3. The isolation transfer cabin for interventional operation according to claim 1, wherein;

the hatch further comprises a hatch cover and a reinforcement device fixed on the hatch cover;

wherein the reinforcement device includes a plurality of lateral support plates and a plurality of longitudinal support rods;

wherein the plurality of lateral support plates are installed at intervals along a length direction of the hatch cover and the plurality of longitudinal support rods are installed at intervals along a perimeter direction between the lateral support plates;

wherein the lateral support plates and the longitudinal support rods are perpendicular to each other and are fixedly connected via connecting pieces; and wherein a top surface of a lateral support plates is flat and both end surfaces of the lateral support plate are symmetrical arcs which are concentric with each other.

4. The isolation transfer cabin for interventional operation according to claim 3, wherein;

the connecting pieces include a connecting bracket and connecting screws;

wherein the connecting bracket is fixed on the lateral support plates via the connecting screws;

wherein the longitudinal support rods are supported by the connecting bracket and fixed thereon; and wherein the lateral support plates and the longitudinal support rods are both fixed on an outer wall of the hatch.

5. The isolation transfer cabin for interventional operation according to claim 1, further comprises:

a drive device for controlling opening or closing of the hatch, wherein the drive device includes a connecting rod and a driving component;

wherein the connecting rod is fixedly mounted on bottom of the rear side of the hatch via a mounting base;

wherein one end of the connecting rod is connected to a support rib fixedly mounted on the left bulkhead; and wherein an output end of the driving component is coupled to the connecting rod to drive the hatch to open or close.

6. The isolation transfer cabin for interventional operation according to claim 1, wherein:

the hatch is further provided on at least one side with one or more lead wire access devices, wherein each of the lead wire access devices are provided with lead wire access interfaces.

7. The isolation transfer cabin for interventional operation according to claim 1, wherein;

a wire in/out device for connecting a wire into the cabin is provided on a top of the hatch;

wherein the wire in/out device includes a flexible sleeve and an end cap assembly; and wherein a bottom of the flexible sleeve is connected to the top of the hatch in a sealed manner;

wherein a top of the flexible sleeve is connected to the end cap assembly in a sealed manner; and wherein the end cap assembly is connected to the top of the hatch in a detachably sealed manner.

8. The isolation transfer cabin for interventional operation according to claim 7, wherein;

the end cap assembly includes an end cap, a sealing plug, a sealing collar, and a sealing ring;

wherein a bottom of the end cap is connected to the top of the hatch in a detachably sealed manner;

wherein the sealing collar is detachably embedded and fit on the end cap;

wherein a bottom of the sealing collar is provided with an annular groove;

wherein a top of the flexible sleeve is pressed into the annular groove by means of the sealing ring;

wherein the sealing plug is concentrically embedded and installed on the sealing collar;

wherein the sealing plug is formed by splicing two half-frustum sealing plates together, both of which are provided with a semicircular recess; and wherein the semicircular recesses on both of the sealing plates cooperate to form a circular through groove for the wire to pass through.

9. The isolation transfer cabin for interventional operation according to claim 7, wherein the flexible sleeve is made of plastic film.

* * * * *